UNITED STATES PATENT OFFICE.

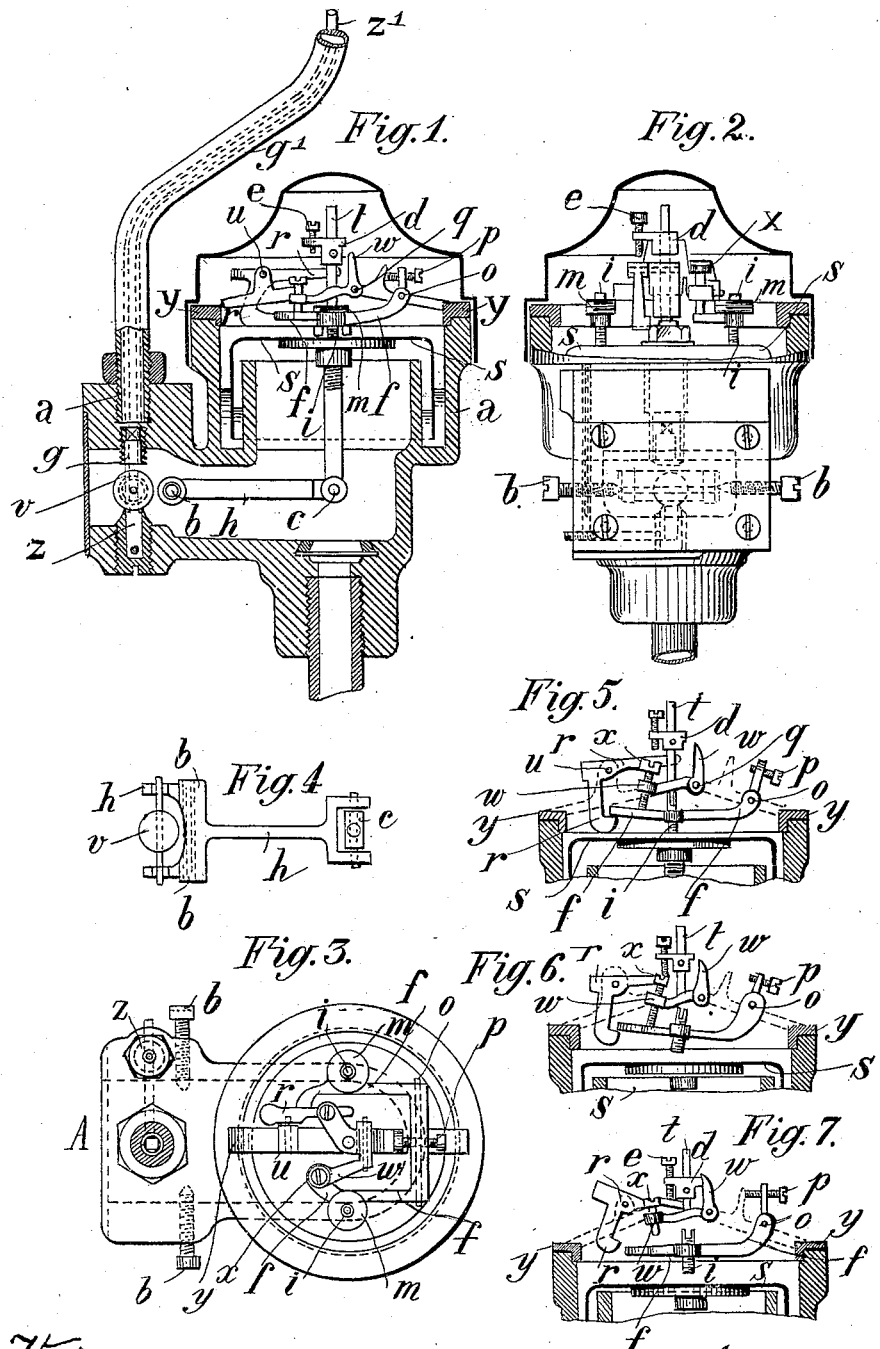

EDUARD ZICKWOLFF, OF SIEGEN, GERMANY.

AUTOMATIC GAS-LIGHTER.

No. 886,914.          Specification of Letters Patent.          Patented May 5, 1908.

Application filed August 20, 1906. Serial No. 331,279.

*To all whom it may concern:*

Be it known that I, EDUARD ZICKWOLFF, a subject of the German Emperor, and resident of Siegen, in the Empire of Germany, have invented certain new and useful Improvements in Automatic Gas-Lighters; and I do hereby declare that the following is a full, clear, and exact description of the invention, such as will enable others skilled in the art to which it appertains to make and use the same.

This invention is based on the use, already known, of a small gas holder bell, placed in a liquid forming a hydraulic mercurial seal, which bell, owing to the variation of pressure of the gas is raised and lowered, resulting in the alternate opening and closing of gas pipes leading to the illuminating and to the lighting flames. Now, as it is a known fact, that the variations of pressure intentionally produced in the gas pipe are very small and allowed only on a moderate scale and the gas holder bell used in the apparatus need be very small, it will be readily understood that the effect produced by the bell in this apparatus is very small. I therefore, multiply the small force available by a lever with unequal arms so as to obtain as great energy as possible for closing and opening the gas pipes. It has also been proposed in this system of construction to diminish the losses caused by friction. As is well known, small accidental variations of pressure frequently take place in gas pipes. In order to render the apparatus unaffected by these, it has been combined with a stopping and releasing device, the object of which is to make it operative only when very strong intentionally-produced variations of pressure above the normal take place, and consequently inoperative at other times.

This invention differs strongly from any apparatus already known of the same kind, firstly because the whole of its mechanism is placed in a closed casing and then, because the losses by friction are suppressed as there exists only the friction of the revolving spindles, there being practically none between the sliding surfaces. The apparatus, therefore, does not easily become inoperative by reason of gripping or other causes and it can easily be regulated.

In the drawings: Figure 1 is a sectional view of the device. Fig. 2 is a side elevation with parts in section. Fig. 3 is a plan. Fig. 4 is a plan of the closing lever with unequal arms and a ball valve. Figs. 5, 6 and 7 are views of the stopping and releasing device in different positions.

The upper portion of the casing constitutes the receptacle $a$ intended to receive the bell $s\ s$, and the closing liquid such as mercury. In the bottom portion, between the points $b\ b$, see Figs. 1 and 2, is mounted the lever with unequal arms $h\ h$ which can easily swing, and the valve seats $g\ z$ for the gas pipes. The small arm of the lever is bifurcated, and thus supports a ball valve $v$ intended to close the gas pipes $g^1$ and $z^1$, the spindle of the ball valve resting on the two branches of the fork see Fig. 4. The long arm of the lever $h$ is connected by a pivot to a rod $t$ of the gas holder bell. The opening and closing of the valve seats are therefore effected with a force which is in proportion to the relation of the two arms of the lever $h$, and to the force which the floating bell can develop when rising and descending.

Y is a ring mounted on the top of the shell $a$.

The rod $t$ of the gas holder bell engages by means of a tappet $d$ with the stopping and releasing device.

$f, f$ is a double lever pivoted at $o$, $w$ is a stopping lever pivoted at $x$, and $r$ is a releasing lever pivoted at $u''$.

Each arm of the double lever is provided with a regulating screw $i\ i$ and the connection between the two arms is provided with a regulating screw $p$. The object of the latter is to bring the lever $f$ into the desired position against the hooked projection of the lever $r$ in order that the latter should engage the lever $f\ f$ at the desired moment and maintain the same for a short time in its raised position. The object of the regulating screws $i\ i$ is to limit the travel of the gas holder bell during the first stage of its rising motion. The stopping lever $w$ forms a crank, the horizontal arm of which is also provided with a regulating screw $c$. The tappet $d$ of the rod $t$ of the bell is also provided with a regulating screw $e$. The screws $i\ i$ which limit the travel of the bell are regulated in such manner that, when the apparatus is at rest as shown in Fig. 7 they do not touch the bell but are at a distance from it. The weight of the bell is so calculated that the normal pressure of the gas cannot raise the bell and it is necessary to produce in the gas pipe a sufficient increase of pressure to make the said bell strike against the regulating screws $i\ i$ without, however, the arms of the double lever $ff$ provided with weights $m\ m$ at discretion being raised, the regulating screws $i, i$, thus, constitute a hindrance limiting the travel of the gas holder bell during the first stage of its motion. During this upward movement, the stop lever $w$ falls, under the influence of its own weight, and engages with a shoulder of the tappet $d$ and the regulating screw of the stop lever comes into contact with the lever $f$ Fig. 1 and 2. The intentionally produced increase of pressure in the gas pipes is not permanent, but lasts for a short time, the pressure of gas soon returning to its normal state. Consequently the bell descends again as long as the mentioned stop has not been operated by the engagement of the stop $w$. From that moment the pressure of gas can fall down to a certain minimum, without the bell being operated thereby. Then in order to remove the stop which took place, it is necessary to produce a wave of pressure in the gas pipes sufficiently strong to raise the bell and the lever $ff$ with the balance weights $m\ m$. In this second stage of the upward movement of the bell (Fig. 5) the stop pawl $w$, owing to the contact of the regulating screw $x$ with the lever $f$, is moved away from the tappet $d$ and the releasing lever $r\ r$ comes with its projection under the raised lever $f$ (Fig. 5). After the disappearance of the pressure wave which has removed the stop, the bell can freely go down to its position of rest (Fig. 7). During the descent, the stop lever $w$ cannot engage again under the tappet $d$, as the lever $f$ is held in its raised position by the projection of the stop lever $r$, the result being that the lever $w$ is held away from the tappet $d$ (Figs. 5 and 6). The disengagement of the lever $f$ takes place only when the tappet $d$ has moved sufficiently down to prevent the lever $w$ from engaging, Fig. 6.

The disengagement of lever $f$ is effected by the striking of the regulating screw $e$ of the tappet $d$ against the releasing lever $r$. In the position of rest, the heel or projection of the lever $r\ r$ is held slightly removed from the lever $f$ by regulating screw $e$. During the first stage of the movement it comes into contact with the lever $f$ (Fig. 1) but it is only during the second stage that it can engage under it (Fig. 5).

The manner of operating of the apparatus is the following one: In the position of rest of the apparatus as shown in Fig. 7 the gas holder bell is in its lowest position and the gas pipe $g$ leading to the illuminating or main flame is thus maintained closed for the lever $h$ connected to the ball valve $v$, while the pipe $z$ leading to the lighting or by pass flame is opened. If it is desired to light the gas it is necessary to produce in the gas pipes an increase of pressure, as already described, sufficient to raise the bell up to the first hindrance of the regulating screws $i\ i$ but without over- coming it. During that rise of the bell the gas pipes leading to the illuminating or main flame, are opened and the flame is lighted, while the pipes leading to the lighting or by pass flame, are closed and extinguished. As the bell is now stopped in the raised position, the fall of pressure of the gas, even to a minimum, and the variations of pressure in the gas pipes cannot act on these lighters at a distance. In order to give as great a play as possible to this variation of pressure, it is advantageous to render the bell sufficiently heavy in order to prevent it from rising, except under a comparatively strong pressure, and also to increase by the weights $m\ m$ the obstacle limiting the first movement of the bell, to such an extent that it should be necessary to produce in the gas pipe a considerable increase of pressure capable of raising the bell up to this obstacle to put the bell in motion and to overcome said obstacle. With this second increase of the gas pressure, the system is released, as already stated, and the bell comes down freely, thus closing the pipes going to the main flame and opening again the conduits going to the by-passes, which then are lighted afresh. The weights on the levers $i f$ can be chosen in such a manner that a certain number of burners be more loaded than others. In that case it is necessary to increase again the gas pressure in order to extinguish the said burners. Burners already extinguished, will then burn only for a short time. The wanted increase of pressure mentioned will be obtained from the gas works at any moment whenever it may be required, and as stated above, it will not be permanent, but will be obtained by means of passing waves of pressure in the gas pipes. The arrangement of the lever's small arm $h$ with a ball valve for closing and opening the gas pipes and the free disposition of the spindle of the ball valve resting on the branches of the fork of the lever $h$—Fig. 4—has been chosen, to be able to close in a sure way the gas pipes. It is understood that the making of this valve and of its seats may be very different.

Having thus described my invention, what I claim is:
1. In an automatic gas lighter, a gasometer bell, a casing, a lever with unequal arms, with the shorter arm branched pivotally mounted beneath the bell, a ball valve the spindle of which rests in the two branches of the short arm of said lever and the long arm of said lever being connected to the rod of said bell, and a double lever mounted above said bell and means for maintaining said double lever in its raised position.
2. In an automatic gas lighter, a gasometer bell, a casing, a lever with unequal arms the shorter of which is branched, pivotally mounted beneath the bell, a ball valve the spindle of which rests in the two branches of the shorter arm of said lever and the long arm of said lever being connected to the rod of the said bell, a ring mounted on the top of said casing, and a stopping and releasing device carrying a tappet engaging the rod of said holder.

3. In an automatic gas lighter, a gasometer bell, a casing, a lever with unequal arms, the shorter of which is branched, pivotally mounted beneath the bell, a ball valve, the spindle of which rests in the two branches of the shorter arm of said lever and the long arm of said lever being connected to the rod of the said bell, and a stopping and releasing device supported from said ring and a tappet engaging the rod of the holder and a regulating screw on each arm of said double lever.

4. In an automatic gas lighter, a gasometer bell, a casing, a lever with unequal arms the shorter of which is branched, pivotally mounted beneath the bell, a ball valve the spindle of which rests in the two branches of the shorter arm of said lever and the long arm of said lever being connected to the rod of the said bell, a ring supported on said casing and a stopping and releasing device supported from said ring and embodying a double lever and a tappet engaging the rod of said holder, a regulating screw on each arm of said double lever, and a regulating device on said tappet.

5. In an automatic gas lighter, a gasometer bell, a casing, a lever with unequal arms the shorter of which is branched, pivotally mounted beneath the bell, a ball valve the spindle of which rests in the two branches of the shorter arm of said lever and the long arm of said lever being connected to the rod of the said bell, a ring supported on said casing and a stopping and releasing device supported from said ring and embodying a double lever and a tappet engaging the rod of said holder, a regulating screw on each arm of said double lever, a regulating device on said tappet, and a cranked stopping lever.

6. In an automatic gas lighter, a gasometer bell, a casing, a lever with unequal arms, the shorter one of which is branched pivotally mounted beneath the bell, a ball valve the spindle of which rests in the two branches of the shorter arm of said lever and the long arm of said lever being connected to the rod of the said bell, a ring supported on said casing and a stopping and releasing device supported from said ring and embodying a double lever and a tappet engaging the rod of said holder, a regulating screw on each arm of said double lever, a regulating device on said tappet, a cranked stopping lever, and a regulating screw in the horizontal arm thereof.

7. In an automatic gas lighter, a gasometer bell, a casing a lever with unequal arm, the shorter of which is branched pivotally mounted beneath the bell, a ball valve the spindle of which rests in the two branches of the shorter arm of said lever and the long arm of said lever being connected to the rod of the said bell, and a stopping and releasing device, embodying a double lever, a tappet engaging the rod of said holder, a regulating screw on each arm of said lever, a regulating device on said tappet, a cranked stopping lever, a regulating screw in the horizontal arm thereof, and weights on the arms of said lever.

In testimony whereof I affix my signature.
EDUARD ZICKWOLFF.
In the presence of—
BESSIE F. DUNLAP,
LOUIS VANDORF.